United States Patent
Sakurai et al.

(10) Patent No.: US 11,059,344 B2
(45) Date of Patent: Jul. 13, 2021

(54) STABILIZER FOR VEHICLE, AND SHOT PEENING JIG FOR STABILIZER

(71) Applicant: NHK SPRING CO., LTD., Yokohama (JP)

(72) Inventors: Yasuharu Sakurai, Yokohama (JP); Yoshihiro Koshita, Yokohama (JP); Akihiko Nishikawa, Yokohama (JP); Akifumi Otani, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 10 days.

(21) Appl. No.: 16/736,870

(22) Filed: Jan. 8, 2020

(65) Prior Publication Data

US 2020/0139783 A1  May 7, 2020

Related U.S. Application Data

(63) Continuation of application No. PCT/JP2017/025777, filed on Jul. 14, 2017.

(51) Int. Cl.
*B60G 21/055* (2006.01)
*B24C 1/10* (2006.01)
*B24C 3/10* (2006.01)

(52) U.S. Cl.
CPC .............. *B60G 21/055* (2013.01); *B24C 1/10* (2013.01); *B24C 3/10* (2013.01);
(Continued)

(58) Field of Classification Search
CPC ............ B60G 21/055; B60G 2202/135; B60G 2206/427; B60G 2206/72;
(Continued)

(56) References Cited

U.S. PATENT DOCUMENTS 7,896,983 B2 * 3/2011 Koyama ................. B23P 15/00
148/519
10,415,110 B2  9/2019 Wakabayashi et al.
(Continued)

FOREIGN PATENT DOCUMENTS

EP  1580047 A1  9/2005
FR  2976588 A1  12/2012
(Continued)

OTHER PUBLICATIONS

International Search Report (ISR) (and English translation thereof) dated Oct. 3, 2017 issued in International Application No. PCT/JP2017/025777.
(Continued)

*Primary Examiner* — Paul N Dickson
*Assistant Examiner* — Daniel M. Keck
(74) *Attorney, Agent, or Firm* — Holtz, Holtz & Volek PC

(57) ABSTRACT

A stabilizer includes bend sections. With respect to positions in a circumferential direction of a radial cross section of each of the bend sections, a center of an inside of a bend is defined as 0°, and a center of an outside of the bend is defined as 180°. The bend sections each include a bend interior section located at 0°, a bend exterior section located at 180°, a first side section located at 90°, and a second side section located at 270°. The bend interior section has compressive residual stress from a surface to a first depth. The bend exterior section has compressive residual stress to a second depth. The first side section has compressive residual stress to a third depth. The second side section has compressive residual stress to a fourth depth.

8 Claims, 8 Drawing Sheets

(52) U.S. Cl.
CPC .. *B60G 2202/135* (2013.01); *B60G 2206/427* (2013.01); *B60G 2206/72* (2013.01); *B60G 2206/8403* (2013.01)

(58) Field of Classification Search
CPC .... B60G 2206/8103; B60G 2206/8403; B24C 1/10; B24C 3/10; Y10T 29/49622; Y10T 29/479; B23P 2700/14
USPC .................................. 280/124.106; 29/897.2
See application file for complete search history.

(56) References Cited

U.S. PATENT DOCUMENTS

| | | | |
|---|---|---|---|
| 2002/0069688 A1 | 6/2002 | Binno | |
| 2005/0214560 A1 | 9/2005 | Yue et al. | |
| 2008/0258367 A1* | 10/2008 | Dixon | B24C 3/085 267/286 |
| 2010/0281938 A1* | 11/2010 | Tange | B24C 1/10 72/53 |
| 2011/0101630 A1* | 5/2011 | Sakai | B21D 7/00 280/5.506 |
| 2017/0043642 A1* | 2/2017 | Kuroda | C21D 9/08 |
| 2017/0349962 A1* | 12/2017 | Kuwatsuka | B21D 47/00 |
| 2018/0073096 A1 | 3/2018 | Wakabayashi et al. | |
| 2018/0117983 A1* | 5/2018 | Wakabayashi | C21D 9/085 |
| 2019/0030979 A1* | 1/2019 | Umezawa | F16F 1/06 |
| 2020/0023707 A1* | 1/2020 | Kawakami | B21D 7/024 |

FOREIGN PATENT DOCUMENTS

| | | | | |
|---|---|---|---|---|
| FR | 3013621 A1 | | 5/2015 | |
| JP | S6164812 A | | 4/1986 | |
| JP | 07266837 A | * | 10/1995 | .......... B60G 21/055 |
| JP | 2000024737 A | * | 1/2000 | |
| JP | 2000024737 A | | 1/2000 | |
| JP | 2010228020 A | | 10/2010 | |
| JP | 2013203309 A | | 10/2013 | |
| JP | 2014213410 A | * | 11/2014 | |
| JP | 2016179764 A | | 10/2016 | |
| KR | 20160015899 A | * | 2/2016 | |
| WO | 2016152671 A1 | | 9/2016 | |

OTHER PUBLICATIONS

Extended European Search Report (EESR) dated Dec. 17, 2020 issued in counterpart European Application No. 17917696.1.

* cited by examiner

STABILIZER FOR VEHICLE, AND SHOT PEENING JIG FOR STABILIZER

CROSS-REFERENCE TO RELATED APPLICATIONS

This application is a Continuation Application of PCT Application No. PCT/JP2017/025777, filed Jul. 14, 2017 and based upon the prior Japanese Patent Application No. 2016-022865, filed Feb. 9, 2016, the entire contents of all of which are incorporated herein by reference.

BACKGROUND OF THE INVENTION

1. Field of the Invention

The present invention relates to a vehicle stabilizer which is placed in a suspension mechanism part of a vehicle such as a car, and a shot peening jig for the stabilizer.

2. Description of the Related Art

The stabilizer placed in the suspension mechanism part of the vehicle is formed of a steel pipe or a solid rod-shaped steel material. The stabilizer comprises a torsion section, a pair of arms continuous with both ends of the torsion section via bend sections, and the bend sections formed between the torsion section and each of the arms. The torsion section extends in a width direction of the vehicle. At distal ends of the arms, eye sections are formed, respectively. In an example of the suspension mechanism part, the torsion section of the stabilizer is supported by a vehicle body via a rubber bushing, etc. The eye sections are coupled to a suspension arm of the suspension mechanism part, etc., via connecting members such as link members. In the stabilizer fitted in the suspension mechanism part, the arms, the bend sections, and the torsion section function as a spring in reaction to a rolling behavior of the vehicle body. The stabilizer thereby can increase the roll stiffness of the vehicle.

In accordance with a traveling condition such as the time when the vehicle travels around a curve, one arm and the other arm of the stabilizer move in directions opposite to each other. Thus, bending force acts on the arms in directions opposite to each other, and bending and torsional force acts on the bend sections. Moreover, partly because the torsion section is twisted, the rolling behavior of the vehicle body is suppressed. Stress due to bending or torsion arises in the arms, the bend sections, and the torsion section. It also has been known that the stress peaks especially in the bend sections.

As a means for increasing the fatigue strength of the stabilizer, a shot peening device has been used. Patent Literature 1 (JP 2010-228020 A) discloses an example of the shot peening device. A projector of the shot peening device projects minute granules (shots) of a cut wire, etc., to the surface of the stabilizer. It also has been proposed that in order to increase the durability of the stabilizer, the bend sections be especially thoroughly subjected to shot peening. However, in the radial cross sections of the bend sections, the distribution of stress arising in each section in a circumferential direction is not uniform. That is, stress peaks at a specific position in the circumferential direction of the bend sections.

While the vehicle is traveling, the bend sections are twisted in a first direction and a second direction opposite to the first direction with equal frequencies. In the radial cross sections of the bend sections, the center of the inside of a bend is defined as 0°, and the center of the outside of the bend is defined as 180°. The distribution of stress in the bend sections is symmetrical with respect to a reference line connecting 0° and 180°. Thus, according to general knowledge, it is appropriate that shots be equally projected to the entire surfaces of the bend sections. Alternatively, shot peening is generally performed, such that the distribution of compressive residual stress is symmetrical with respect to the reference line connecting 0° and 180° as the axis of symmetry.

As a result of researches eagerly done by the inventors of the present invention, it was found that depending on the form of the suspension mechanism part, in which the stabilizer is placed, it is not necessarily the most desirable that the distribution of stress in the bend sections be symmetrical with respect to the reference axis as the axis of symmetry. For example, because of a bounding stone touching the lower surface of the stabilizer or a snow-melting agent adhering to the lower surface of the stabilizer while the vehicle is traveling, a minute corrosion pit may arise. If this corrosion pit grows to a certain degree, the depth of the pit may exceed the depth of compressive residual stress. Thus, if the depth of compressive residual stress in the lower surface of the stabilizer is equal to the depth of compressive residual stress in the upper surface of the stabilizer, the lower surface of the stabilizer may be weak in strength.

The shot peening device disclosed in Patent Literature 1 subjects stabilizers to shot peening one by one. Thus, the operation efficiency is low, and there is also a problem in that the shot peening device cannot be efficiently used.

BRIEF SUMMARY OF THE INVENTION

Accordingly, an object of the present invention is to provide a vehicle stabilizer having a stress distribution which is suitable for the durability of bend sections, and a shot peening jig capable of subjecting stabilizers to shot peening efficiently.

A stabilizer made of a rod-shaped steel material according to one embodiment comprises a torsion section extending in a width direction of a vehicle, a pair of bend sections continuous with both ends of the torsion section, and a pair of arms continuous with the respective bend sections. With respect to positions in a circumferential direction of a radial cross section of each of the bend sections, a center of an inside of a bend is defined as 0°, a center of an outside of the bend is defined as 180°, a midpoint between 0° and 180° is defined as 90°, and an opposite side to 90° is defined as 270°. The bend sections each comprise a bend interior section, a bend exterior section, a first side section, and a second side section. The bend interior section is located at 0° and has compressive residual stress from a surface of the steel material to a first depth. The bend exterior section is located at 180° and has compressive residual stress from the surface to a second depth. The first side section is located at 90° and has compressive residual stress from the surface to a third depth. The second side section is located at 270° and has compressive residual stress from the surface to a fourth depth. A sum of the compressive residual stress from the surface to the first depth of the bend interior section is greater than a sum of the compressive residual stress from the surface to the second depth of the bend exterior section. Moreover, a sum of the compressive residual stress from the surface to the fourth depth of the second side section is greater than a sum of the compressive residual stress from the surface to the third depth of the first side section. The first depth is greater than the second depth. The fourth depth is greater than the third depth.

According to the present invention, a stabilizer having a distribution of compressive residual stress which is suitable to increase the durability of bend sections can be obtained, and the durability of the stabilizer can be improved.

In an example of the stabilizer, the steel material is a steel pipe, and a thickness of the bend exterior section is smaller than a thickness of the bend interior section. In addition, the stabilizer may be placed in the vehicle in a state in which the first side section is located on an upper side of the vehicle and the second side section is located on a lower side of the vehicle.

A shot peening jig according to one embodiment comprises a vertically extending center rod, upper arm sections, and lower arm sections. The upper arm sections are radially provided at an upper part of the center rod. The lower arm sections, which are equal in number to the upper arm sections, are radially provided at a lower part of the center rod. The upper arm sections each support an eye section formed in an arm on one side of stabilizers. Torsion sections of the stabilizers are thereby held in substantially perpendicular positions along the center rod. The lower arm sections support an arm on another side of the stabilizers. In a state in which the stabilizers are suspended by the upper arm sections, a bend interior section and a second side section of each of the stabilizers face outward from the center rod. In addition, the bend exterior section and the first side section face inward. Distal ends of the upper arm sections may be each provided with a pin which is inserted into a hole of the eye section of the arm on the one side. Distal ends of the lower arm sections may be each provided with a hook section which supports the arm on the another side.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A stabilizer according to one embodiment of the present invention will be described hereinafter with reference to FIG. 1 to FIG. 3.

Figure 1:
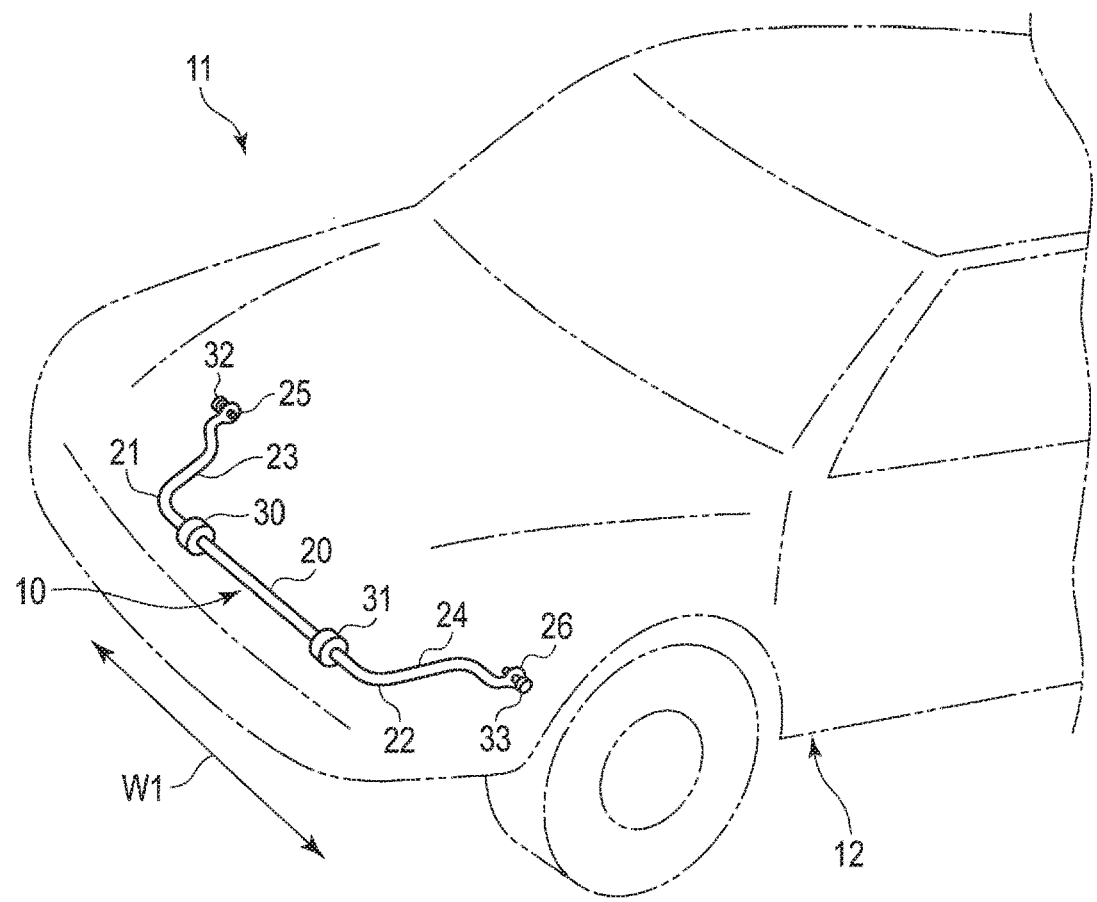
FIG. 1 is a perspective view showing part of a vehicle and a stabilizer.

FIG. 1 shows part of a vehicle 11 comprising a stabilizer 10. FIG. 2 is a plan view of the stabilizer 10. The stabilizer 10 is placed in a suspension mechanism part of the vehicle 11. The stabilizer 10 includes a torsion section 20, a pair of bend sections 21 and 22, and a pair of arms 23 and 24. The torsion section 20 extends in a width direction (direction indicated by an arrow W1 in FIG. 1) of a vehicle body 12 of the vehicle 11. The bend sections 21 and 22 are continuous with both ends of the torsion section 20. The arms 23 and 24 are continuous with the respective bend sections 21 and 22. The stabilizer 10 is formed by a bending machine. A material of the stabilizer 10 is rod-shaped spring steel. The spring steel is selected from types of steel that can improve in strength by heat treatment such as quenching. Because the stabilizer 10 is hollow in the present embodiment, its material is a hollow steel material (steel pipe) 10A. In the case of a solid stabilizer, a solid steel material is used.

Figure 2:
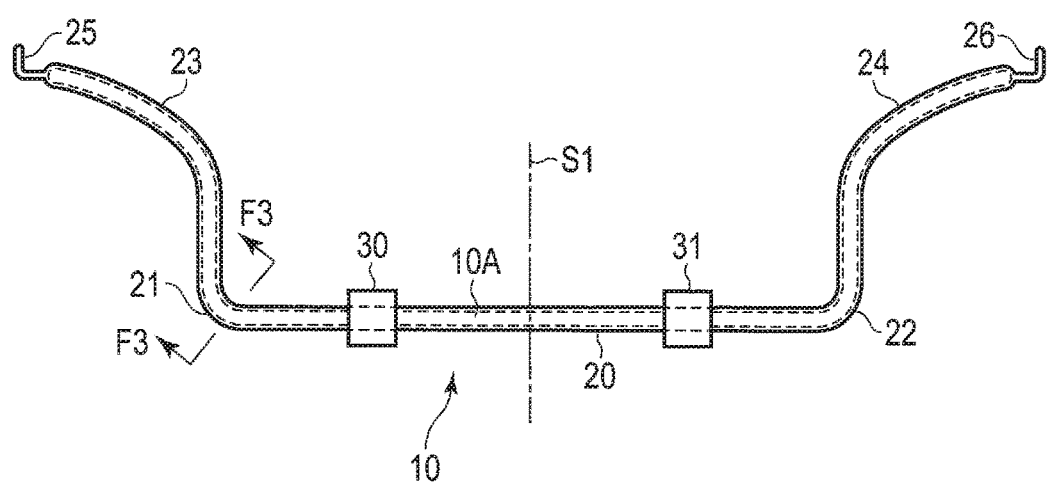
FIG. 2 is a plan view showing an example of the stabilizer.

The stabilizer 10 is bilaterally symmetrical around an axis of symmetry S1 (shown in FIG. 2). Eye sections 25 and 26 are formed at both ends of the stabilizer 10. The shape of the stabilizer 10 is not limited to that of FIG. 2. For example, the torsion section 20 and the arms 23 and 24 may have one or more bend sections. The shapes of the eye sections 25 and 26 also vary according to the form of the suspension mechanism part. That is, the stabilizer may have various shapes including a three-dimensionally bent shape. In addition, the stabilizer may be bilaterally asymmetrical.

The torsion section 20 is supported by, for example, part of the vehicle body 12 via a pair of support sections 30 and 31. The support sections 30 and 31 each comprise a rubber bushing, etc. The pair of eye sections 25 and 26 are connected to, for example, a suspension arm of the suspension mechanism part via connecting members 32 and 33 (shown in FIG. 1), respectively. The connecting members 32 and 33 are, for example, stabilizer links. When the vehicle 11 travels around a curve, (upward or downward) loads of opposite phases are input to the arms 23 and 24. Then, bending force in directions opposite to each other acts on the arms 23 and 24, and bending and torsional force acts on the bend sections 21 and 22. Further, the torsion section 20 is twisted. A resultant repulsive load suppresses the rolling behavior of the vehicle body 12.

The bend sections 21 and 22 are bilaterally symmetrical with respect to the axis of symmetry S1 (shown in FIG. 2). Thus, the first bend section 21 (FIG. 3) will be representatively described hereinafter. The second bend section 22 also has the same structure.

Figure 3:
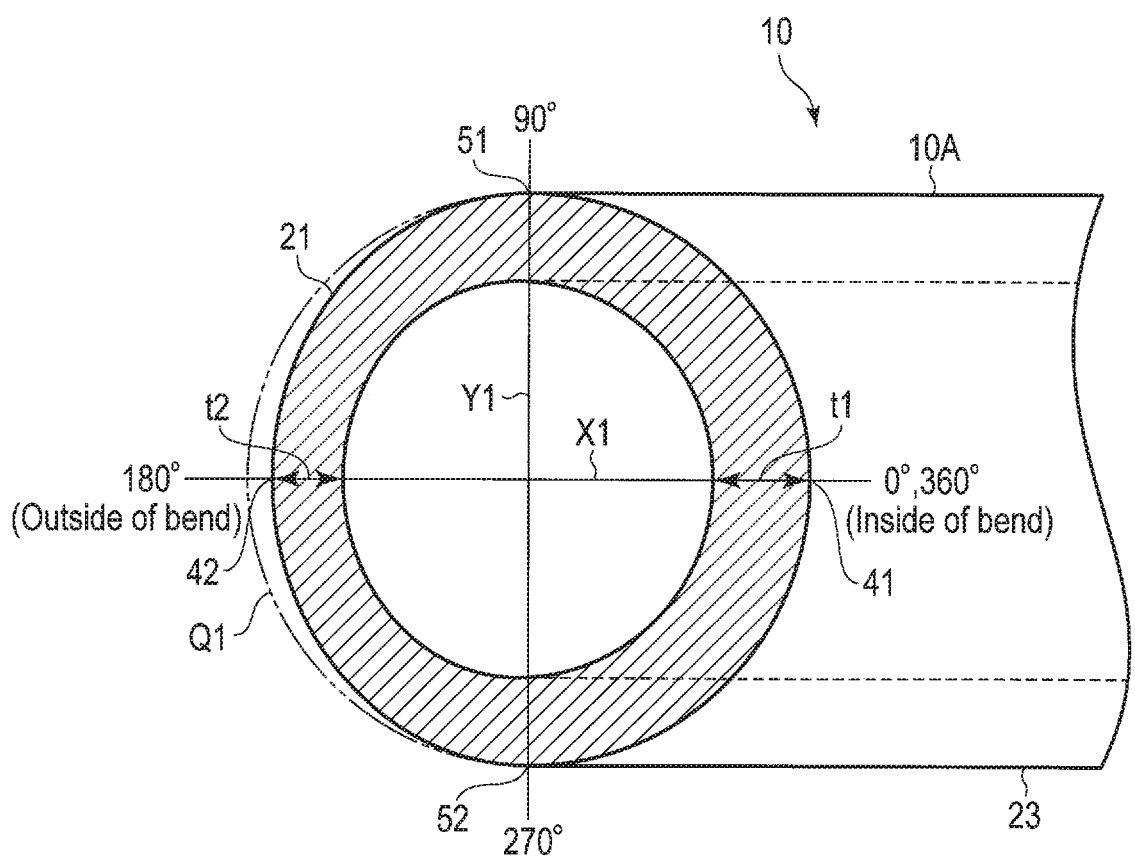
FIG. 3 is a radial cross-sectional view of a bend section of the stabilizer along line F3-F3 of FIG. 2.

FIG. 3 shows a radial cross section of the bend section 21. In this specification, with respect to positions in a circumferential direction of the radial cross section of the bend section 21, the center of the inside of a bend is defined as 0°, the center of the outside of the bend is defined as 180°, the midpoint between 0° and 180° is defined as 90°, and the opposite side to 90° is defined as 270°. A segment X1 connecting 0° and 180° is referred to as a reference line, and a segment Y1 (segment connecting 90° and 270°) which forms a right angle with the segment X1 is referred to as a perpendicular line.

The bend section 21 includes a bend interior section 41 located at 0°, a bend exterior section 42 located at 180°, a first side section 51 located at 90°, and a second side section 52 located at 270°, when the center of the inside of the bend is defined as 0° and the center of the outside of the bend is defined as 180° with respect to positions in the circumferential direction of the radial cross section.

A steel pipe, which is a material of the stabilizer 10, is bent by a bending machine. Thus, in the radial cross section of the bend section 21, the thickness t2 of the bend exterior section 42 is smaller than the thickness t1 of the bend interior section 41. Moreover, the outside (90° to 270°) of the bend has a somewhat flat cross-sectional shape. A two-dot chain line Q1 in FIG. 3 represents a contour of the outer surface (which is substantially a perfect circle) of the steel pipe to be bent.

A shot peening jig 60 will be described hereinafter with reference to FIG. 4 to FIG. 8.

Figure 4:
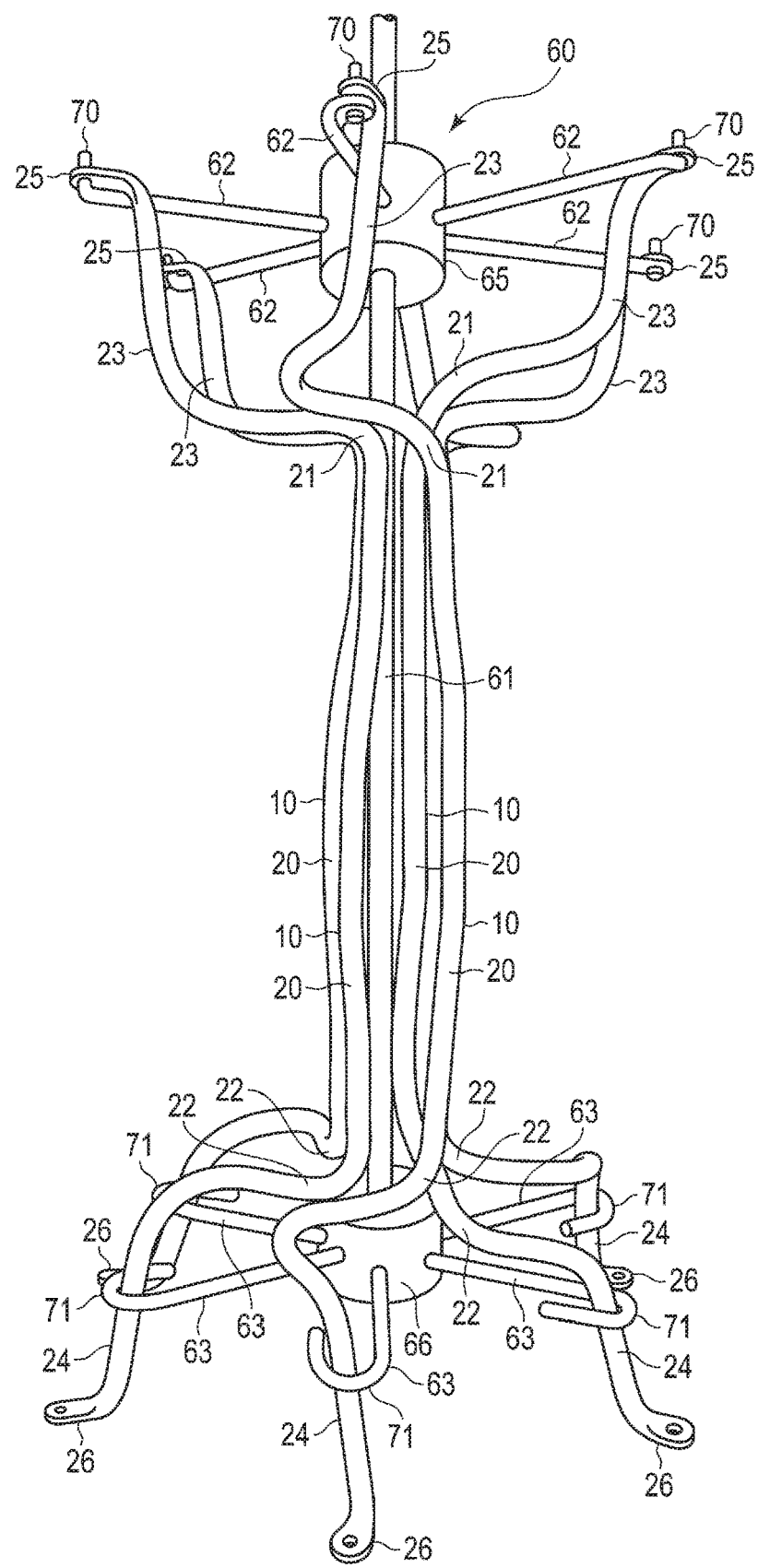
FIG. 4 is a perspective view showing stabilizers and a shot peening jig according to one embodiment.
Figure 5:
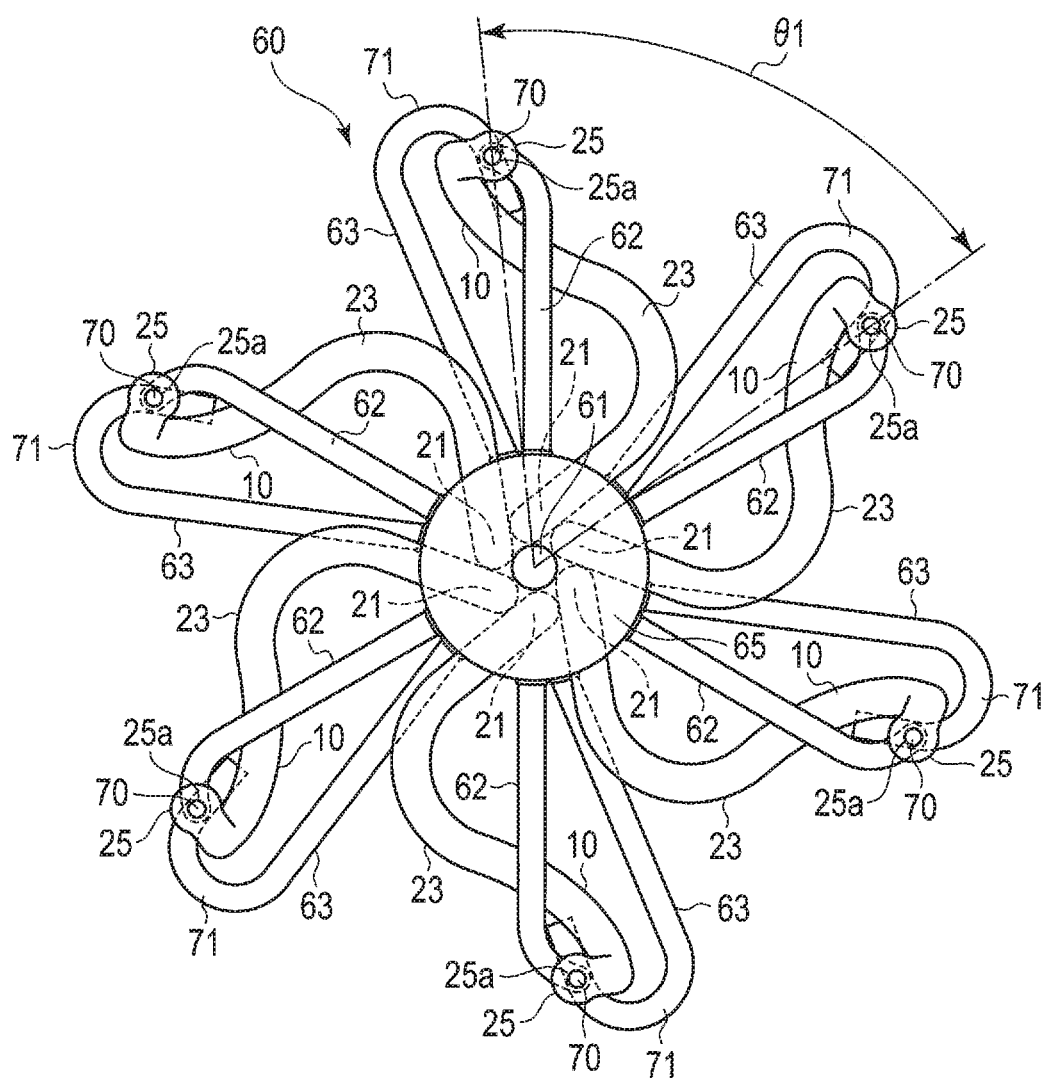
FIG. 5 is a plan view showing the stabilizers and the shot peening jig shown in FIG. 4 from above.
Figure 6:
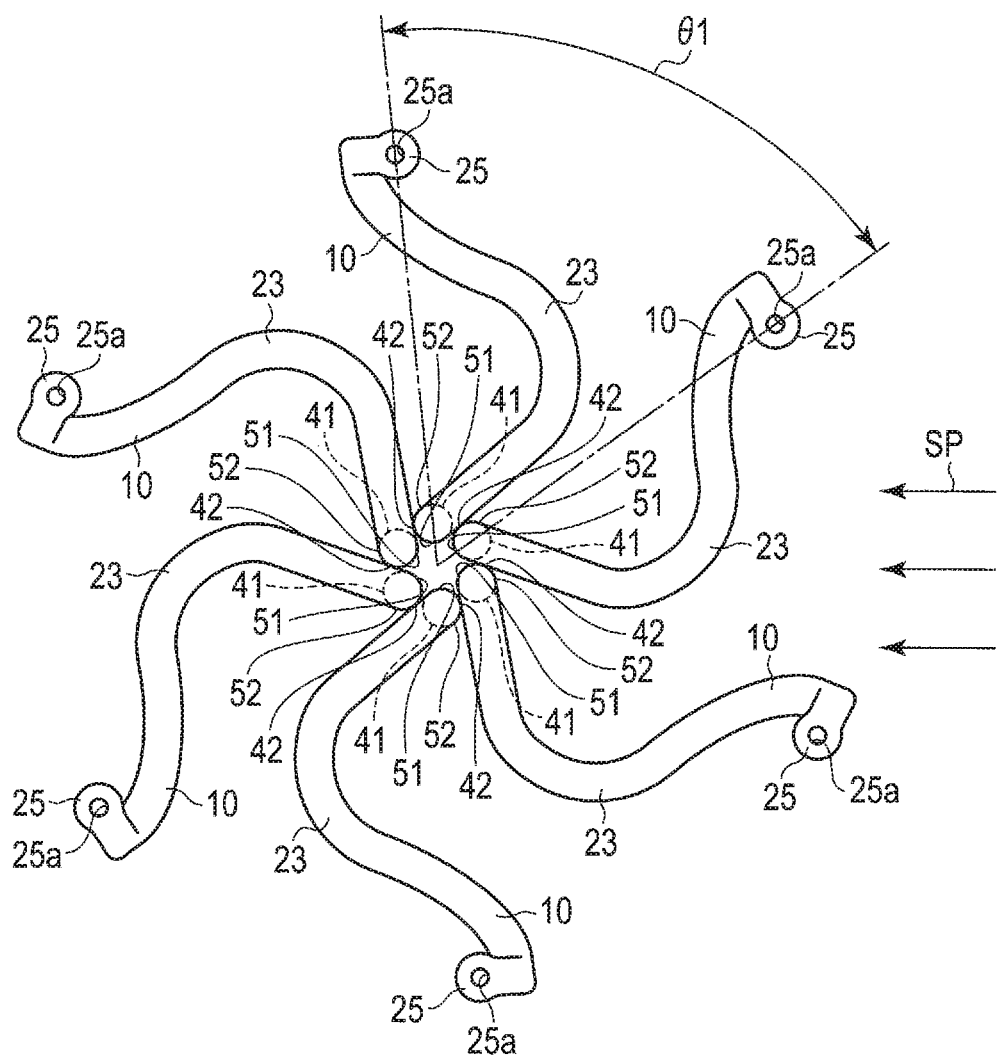
FIG. 6 is a plan view showing only the stabilizers shown in FIG. 4 from above.
Figure 7:
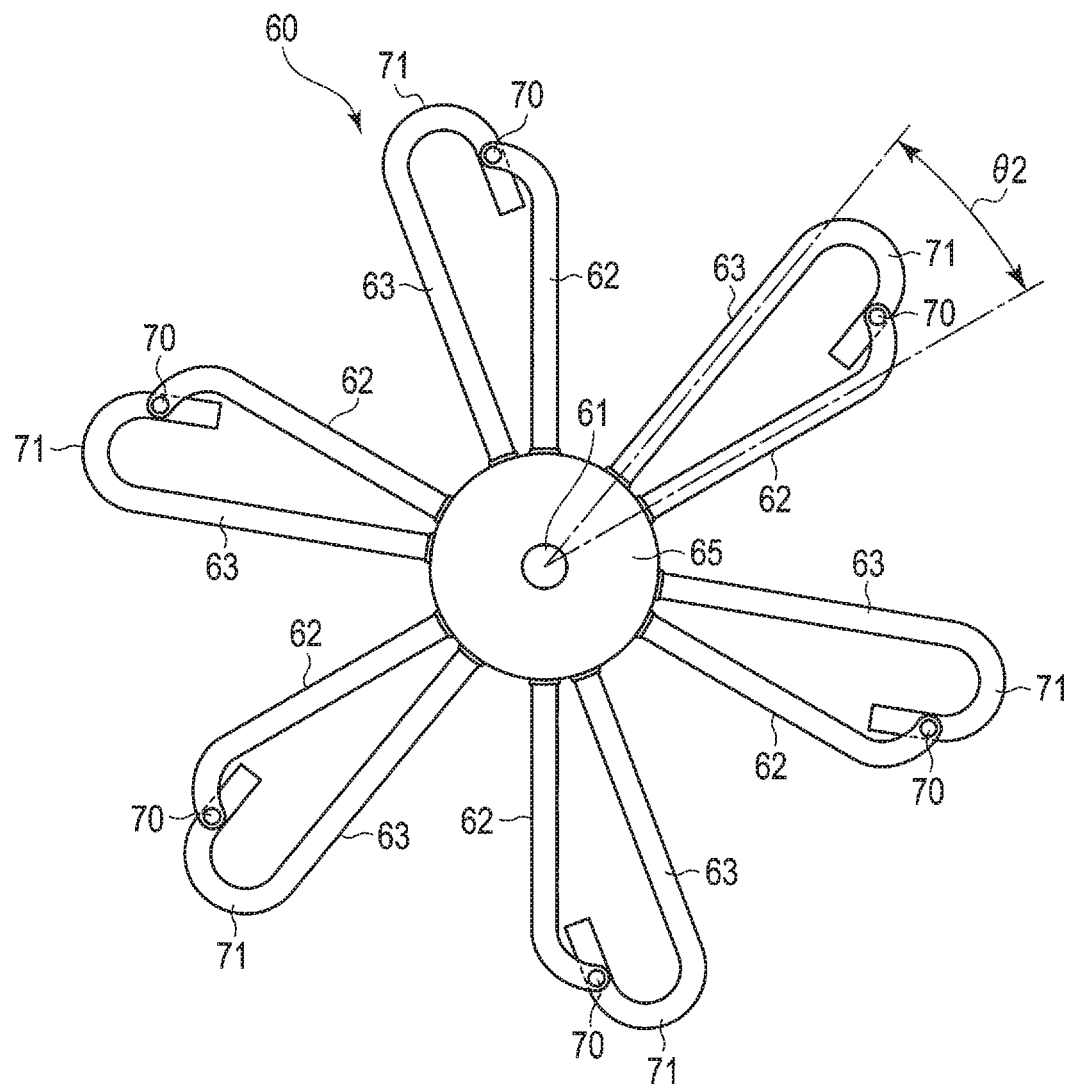
FIG. 7 is a plan view showing only the shot peening jig shown in FIG. 4 from above.

FIG. 4 shows the shot peening jig 60 and a plurality of stabilizers 10. The stabilizers (for example, six stabilizers) 10 are held by the shot peening jig 60. FIG. 5 is a plan view showing the shot peening jig 60 and the stabilizers 10 from above. FIG. 6 is a plan view showing only the stabilizers 10 from above. FIG. 7 is a plan view showing only the shot peening jig 60 from above.

The shot peening jig 60 comprises a vertically extending center rod 61, a plurality of upper arm sections (for example, six upper arm sections) 62, and a plurality of lower arm sections (for example, six lower arm sections) 63. The upper arm sections 62 are provided at the upper part of the center rod 61. The lower arm sections 63 are provided at the lower part of the center rod 61. The upper arm sections 62 are fixed to the center rod 61 via an upper attachment base 65. The lower arm sections 63 are fixed to the center rod 61 via a lower attachment base 66.

The number of provided upper arm sections 62 corresponds to the number (for example, six) of stabilizers 10 to be supported at once by the shot peening jig 60. These upper arm sections 62 have a common shape. The upper arm sections 62 are radially provided at regular intervals in a circumferential direction of the attachment base 65 outward from the center rod 61. At the respective distal ends of the upper arm sections 62, pins 70 are provided. The pins 70 project upward from the distal ends of the upper arm sections 62. The pins 70 are inserted into holes 25a of the eye sections 25 on one side of the stabilizers 10.

The same number (for example, six) of lower arm sections 63 as the number of the upper arm sections 62 are provided. The lower arm sections 63 have a common shape. The lower arm sections 63 are radially provided at regular intervals in a circumferential direction of the attachment base 66 outward from the center rod 61. At the respective distal ends of the lower arm sections 63, hook sections 71 are formed. The hook sections 71 are shaped (for example, U-shaped) to hold the arms 24 located on the lower side in FIG. 4, such that the arms 24 are surrounded.

The eye sections 25 of the arms 23 on one side of the stabilizers 10 are supported by the pins 70 of the upper arm sections 62. The supported stabilizers 10 hang down under their own weight. The arms 24 on the other side are held by the hook sections 71 of the lower arm sections 63. In this state, the stabilizers 10 are vertically positioned with the torsion sections 20 extending along the center rod 61. The stabilizers 10 are simultaneously suspended by the shot peening jig 60 at angles 81 (shown in FIG. 5 and FIG. 6) of regular intervals in a circumferential direction of the center rod 61. The angles θ1 are, for example, 60°. Shots are projected from a direction indicated by arrows SP in FIG. 6.

As shown in FIG. 4 to FIG. 6, the stabilizers 10 are suspended by the shot peening jig 60. In the suspended stabilizers 10, as shown in FIG. 6, the bend interior sections 41 and the second side sections 52 face outward. In addition, the bend exterior sections 42 and the first side sections 51 face inward. That is, in order that the bend interior sections 41 and the second side sections 52 face outward, angles θ2 (shown in FIG. 7) between the upper arm sections 62 and the lower arm sections 63, the shapes and the lengths of the upper arm sections 62 and the lower arm sections 63, the positions of the pins 70, the shapes of the hook sections 71, etc., are set according to the kind of the stabilizers 10.

Figure 8:
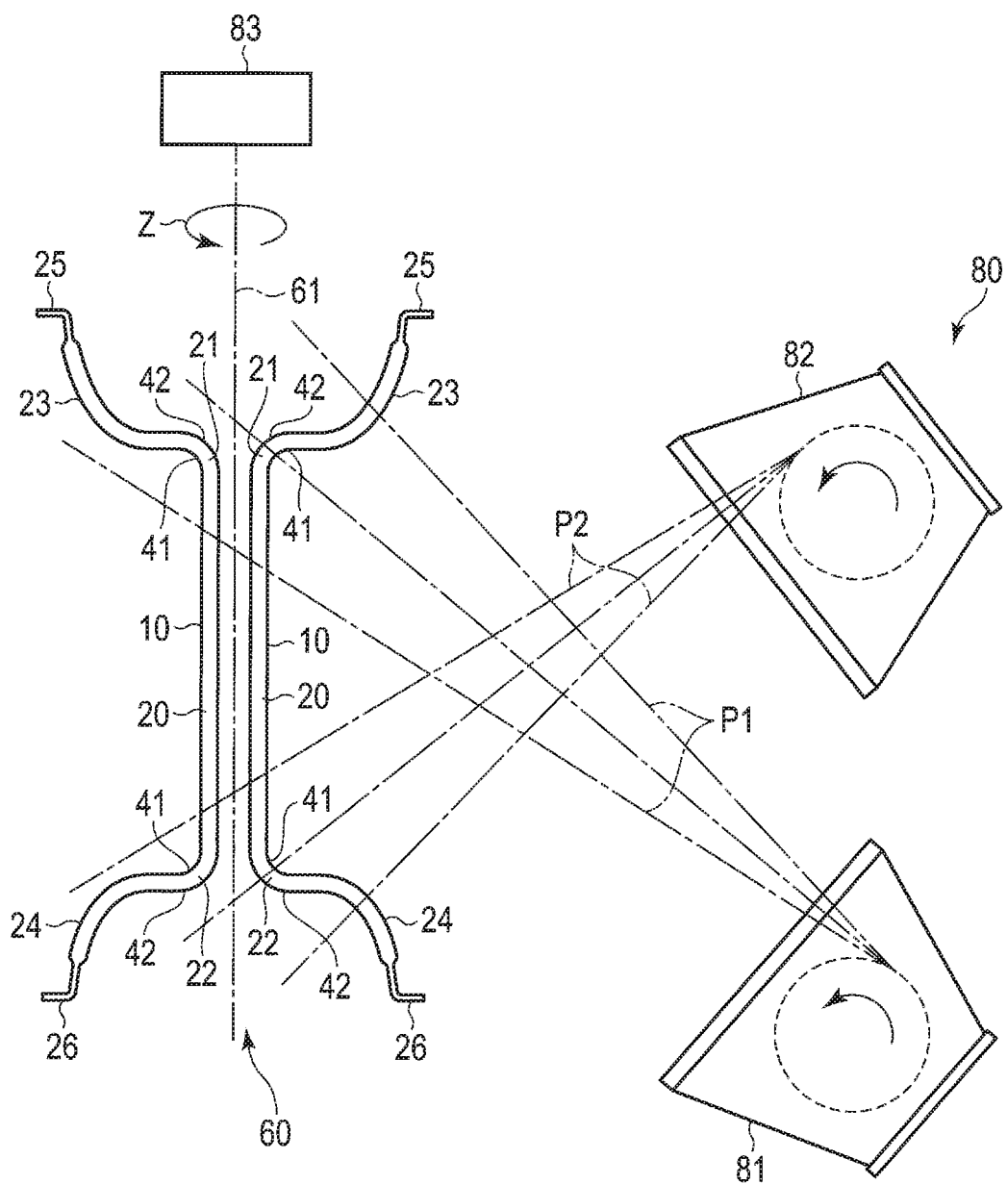
FIG. 8 is a side view schematically showing stabilizers and a shot peening device.

FIG. 8 schematically shows a shot peening device 80. The shot peening device 80 subjects the stabilizers (for example, six stabilizers) 10 held by the shot peening jig 60 to shot peening. The shot peening device 80 comprises a first shot projector 81 placed on the lower side, a second shot projector 82 placed on the upper side, and a rotation mechanism 83. The rotation mechanism 83 rotates the shot peening jig 60 around the center rod 61. For example, the six stabilizers 10 are simultaneously held by the shot peening jig 60. In this state, the shot peening jig 60 and the stabilizers 10 rotate together in a direction indicated by an arrow Z.

The first shot projector 81 projects shots toward the first bend sections 21. One-dot chain lines P1 in FIG. 8 schematically represent the projection direction of shots. Shots projected from the first shot projector 81 collide with the upper half part of a stabilizer 10 located close to the first shot projector 81 (on the right side in FIG. 8), etc. Compressive residual stress thereby arises in the surface of the upper half part of the stabilizer 10 close to the first shot projector 81. Shots projected from the first shot projector 81 collide also with a stabilizer 10 located distant from the first shot projector 81 (on the left side in FIG. 8). Thus, compressive residual stress arises also in the surface of the upper half part of the stabilizer 10 distant from the first shot projector 81.

The second shot projector 82 projects shots toward the second bend sections 22. One-dot chain lines P2 in FIG. 8 schematically represent the projection direction of shots. Shots projected from the second shot projector 82 collide with the lower half part of the stabilizer 10 located close to the second shot projector 82 (on the right side in FIG. 8), etc. Compressive residual stress thereby arises in the surface of the lower half part of the stabilizer 10 close to the second shot projector 82. Shots projected from the second shot projector 82 collide also with the stabilizer 10 located distant from the second shot projector 82 (on the left side in FIG. 8). Thus, compressive residual stress arises also in the surface of the lower half part of the stabilizer 10 distant from the second shot projector 82.

As shown in FIG. 6, in the stabilizers 10 held by the shot peening jig 60, the bend interior sections 41 and the second side sections 52 each face outward. In addition, the bend exterior sections 42 and the first side sections 51 face inward. Thus, shots projected from the first shot projector 81 and the second shot projector 82 effectively hit especially the bend interior sections 41 and the second side sections 52.

Figure 9:
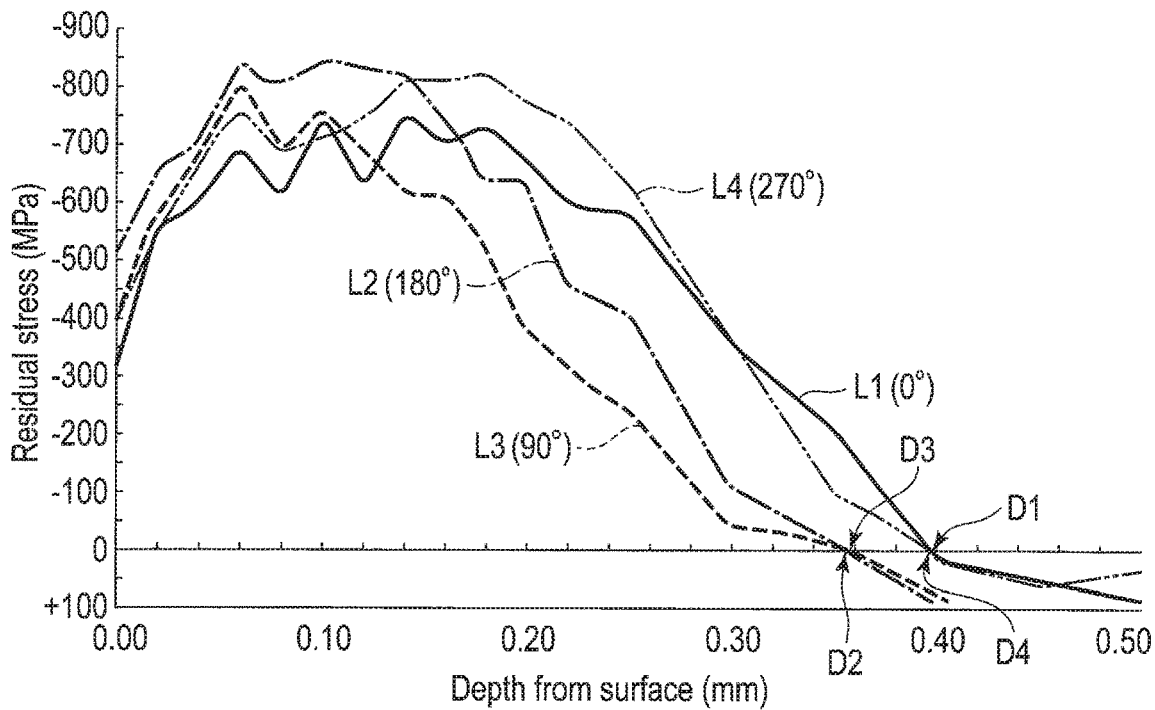
FIG. 9 is a graph showing the relationship between the depths from a surface and the magnitudes of residual stress of four positions in a circumferential direction of a first bend section of a stabilizer of one embodiment.

FIG. 9 shows the relationship between the depth from a surface and the magnitude of residual stress of each of four positions (0°, 90°, 180°, and 270°) in a circumferential direction of the first bend sections 21 after shot peening. A solid line L1 in FIG. 9 represents the distribution of residual stress in the bend interior sections 41 (0°). A one-dot chain line L2 represents the distribution of residual stress in the bend exterior sections 42 (180°). A broken line L3 represents the distribution of residual stress in the first side sections 51 (90°). A two-dot chain line L4 represents the distribution of residual stress in the second side sections 52 (270°).

As shown in FIG. 9, in the bend interior sections 41 (0°), compressive residual stress is formed from the surface to a first depth D1. In the bend exterior sections 42 (180°), compressive residual stress is formed to a second depth D2. The first depth D1 is greater than the second depth D2. In the first side sections 51 (90°), compressive residual stress is formed to a third depth D3. In the second side sections 52 (270°), compressive residual stress is formed to a fourth depth D4. The fourth depth D4 is greater than the third depth D3.

As shown in FIG. 9, the absolute value of compressive residual stress of the bend interior sections 41 (0°) is greater than the absolute value of compressive residual stress of the bend exterior sections 42 (180°) in a region deeper than 0.15 mm. Furthermore, the sum (area) of compressive residual stress from the surface to the first depth D1 of the bend interior sections 41 (0°) is greater than the sum (area) of compressive residual stress from the surface to the second depth D2 of the bend exterior sections 42 (180°). The absolute value of compressive residual stress of the second side sections 52 (270°) is greater than the absolute value of compressive residual stress of the first side sections 51 (90°) at any depth. Furthermore, the sum (area) of compressive residual stress from the surface to the fourth depth D4 of the second side sections 52 (270°) is greater than the sum (area) of compressive residual stress from the surface to the third depth D3 of the first side sections 51 (90°).

Figure 10:
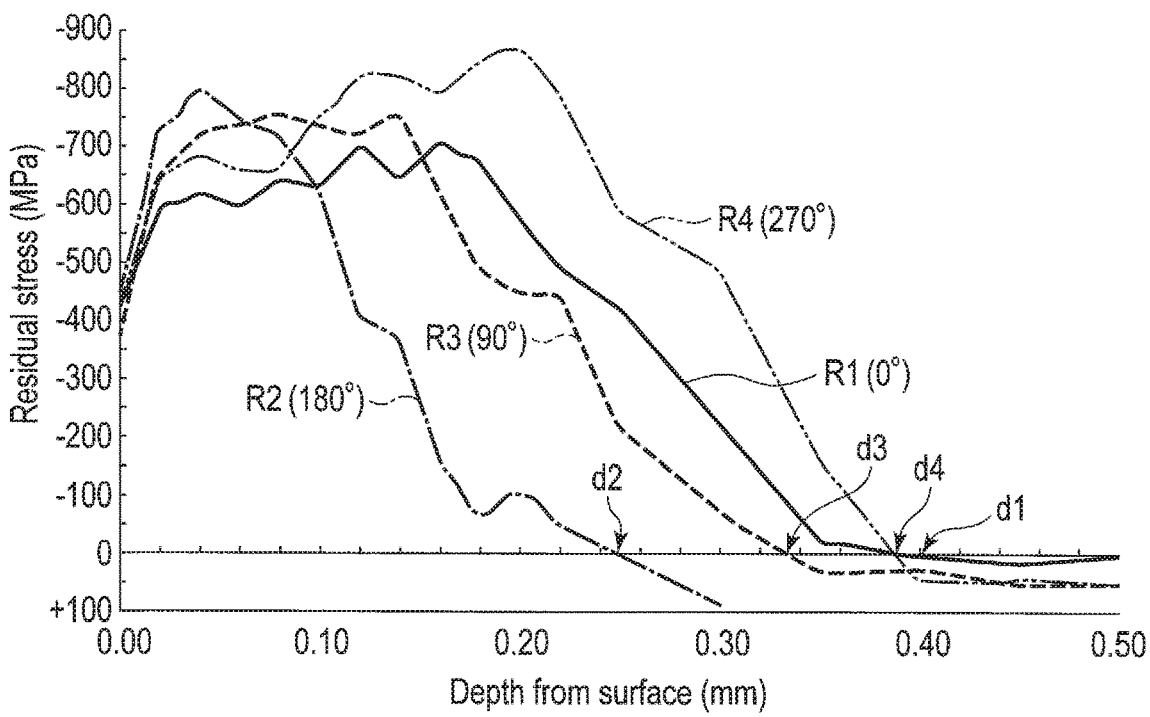
FIG. 10 is a graph showing the relationship between the depths from a surface and the magnitudes of residual stress of four positions in a circumferential direction of a second bend section of the stabilizer.

FIG. 10 shows the relationship between the depth from a surface and the magnitude of residual stress of each of four positions (0°, 90°, 180°, and 270°) in a circumferential direction of the second bend sections 22 after shot peening. A solid line R1 in FIG. 10 represents the distribution of residual stress in the bend interior sections 41 (0°). A one-dot chain line R2 represents the distribution of residual stress in the bend exterior sections 42 (180°). A broken line R3 represents the distribution of residual stress in the first side sections 51 (90°). A two-dot chain line R4 represents the distribution of residual stress in the second side sections 52 (270°).

As shown in FIG. 10, in the bend interior sections 41 (0°), compressive residual stress is formed from the surface to a first depth d1. In the bend exterior sections 42 (180°), compressive residual stress is formed to a second depth d2. The first depth d1 is greater than the second depth d2. In the first side sections 51 (90°), compressive residual stress is formed to a third depth d3. In the second side sections 52 (270°), compressive residual stress is formed to a fourth depth d4. The fourth depth d4 is greater than the third depth d3.

As shown in FIG. 10, the absolute value of compressive residual stress of the bend interior sections 41 (0°) is greater than the absolute value of compressive residual stress of the bend exterior sections 42 (180°) in a region deeper than 0.10 mm. Furthermore, the sum (area) of compressive residual stress from the surface to the first depth d1 of the bend interior sections 41 (0°) is greater than the sum (area) of compressive residual stress from the surface to the second depth d2 of the bend exterior sections 42 (180°). The absolute value of compressive residual stress of the second side sections 52 (270°) is greater than the absolute value of compressive residual stress of the first side sections 51 (90°) at any depth. Moreover, the sum (area) of compressive residual stress from the surface to the fourth depth d4 of the second side sections 52 (270°) is greater than the sum (area) of compressive residual stress from the surface to the third depth d3 of the first side sections 51 (90°).

That is, in both of the cases of FIG. 9 and FIG. 10, the sum (area) of compressive residual stress of the bend interior sections 41 (0°) is greater than the sum (area) of compressive residual stress of the bend exterior sections 42 (180°), and the sum (area) of compressive residual stress of the second side sections 52 (270°) is greater than the sum (area) of compressive residual stress of the first side sections 51 (90°).

Regarding the stabilizers 10 of the present embodiment, in both of the first bend sections 21 and the second bend sections 22, compressive residual stress is formed in the bend interior sections 41 to a deeper position than in the bend exterior sections 42. Furthermore, the sum (area) of compressive residual stress in the bend interior sections 41 is greater than the sum (area) of compressive residual stress in the bend exterior sections 42. That is, the distribution of compressive stress is effective for the peak of stress, which may exists in the bend interior sections 41. Thus, the bend interior sections 41 can be prevented from being weak in durability.

Moreover, in both of the first bend sections 21 and the second bend sections 22, compressive residual stress is formed in the second side sections 52 to a deeper position than in the first side sections 51. Furthermore, the sum (area) of compressive residual stress in the second side sections 52 is greater than the sum (area) of compressive residual stress in the first side sections 51. The second side sections 52 face a road surface, and thus are likely to touch a stone bounding from the road surface or a road anti-icing agent while the vehicle is traveling. The stabilizers 10 of the present embodiment have the distribution of compressive residual stress, which is effective in suppressing the influence of a corrosion pit even if the corrosion pit arises in the second side sections 52. According to the form of the suspension mechanism part and the specifications of the stabilizers, the stabilizers may be placed, such that the second side sections 52 are located on the upper side.

When the present invention is put into practice, the distribution of compressive residual stress may be changed as appropriate without departing from the present invention, according to the form of the suspension mechanism part or the specifications of the stabilizers. In addition, it goes without saying that the specific shapes of the torsion sections, the arms, and the bend sections, the placement of the stabilizers, etc., as well as the materials of the stabilizers, can be variously changed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle stabilizer made of a rod-shaped steel material comprising:
 a torsion section extending in a width direction of a vehicle;
 a pair of bend sections continuous with both ends of the torsion section; and a pair of arms continuous with the respective bend sections,
wherein
the bend sections each comprise
a bend interior section which is located at 0° and which has compressive residual stress from a surface of the steel material to a first depth,
a bend exterior section which is located at 180° and which has compressive residual stress from the surface to a second depth,
a first side section which is located at 90° and which has compressive residual stress from the surface to a third depth, and
a second side section which is located at 270° and which has compressive residual stress from the surface to a fourth depth,
when a center of an inside of a bend is defined as 0°, a center of an outside of the bend is defined as 180°, a midpoint between 0° and 180° is defined as 90°, and an opposite side to 90° is defined as 270° with respect to positions in a circumferential direction of a radial cross section;
a sum of the compressive residual stress from the surface to the first depth of the bend interior section is greater than a sum of the compressive residual stress from the surface to the second depth of the bend exterior section; and
a sum of the compressive residual stress from the surface to the fourth depth of the second side section is greater than a sum of the compressive residual stress from the surface to the third depth of the first side section.

2. The vehicle stabilizer of claim 1, wherein
the first depth is greater than the second depth; and
the fourth depth is greater than the third depth.

3. The vehicle stabilizer of claim 1, wherein
the steel material is a steel pipe; and
a thickness of the bend exterior section is smaller than a thickness of the bend interior section.

4. The vehicle stabilizer of claim 1, wherein
the stabilizer is placed in the vehicle in a state in which the first side section is located on an upper side of the vehicle and the second side section is located on a lower side of the vehicle.

5. A shot peening jig for stabilizers made of rod-shaped steel materials each comprising a torsion section extending in a width direction of a vehicle, a pair of bend sections continuous with both ends of the torsion section, a pair of arms continuous with the respective bend sections, and eye sections formed at distal ends of the arm sections,
wherein
the stabilizers each comprise a bend interior section located at 0°, a bend exterior section located at 180°, a first side section located at 90°, and a second side section located at 270°, when a center of an inside of a bend of each of the bend sections is defined as 0°, a center of an outside of the bend is defined as 180°, a midpoint between 0° and 180° is defined as 90°, and an opposite side to 90° is defined as 270° with respect to positions in a circumferential direction of a radial cross section of each of the bend sections;
the shot peening jig comprises
a vertically extending center rod,
upper arm sections which are radially provided at an upper part of the center rod and which each support the eye section formed in the arm on one side of the stabilizers and thereby hold the torsion section in a position along the center rod, and
lower arm sections which are equal in number to the upper arm sections, which are radially provided at a lower part of the center rod, and which support the arm on another side of the stabilizers; and
in a state in which the stabilizers are suspended, the bend interior section and the second side section of each of the stabilizers face outward from the center rod, and the bend exterior section and the first side section face inward.

6. The shot peening jig of claim 5, wherein
distal ends of the upper arm sections are each provided with a pin which is inserted into a hole of the eye section of the arm on the one side.

7. The shot peening jig of claim 5, wherein
distal ends of the lower arm sections are each provided with a hook section which supports the arm on the another side.

8. The shot peening jig of claim 6, wherein
distal ends of the lower arm sections are each provided with a hook section which supports the arm on the another side.

* * * * *